US006772556B1

(12) United States Patent
Liu

(10) Patent No.: US 6,772,556 B1
(45) Date of Patent: Aug. 10, 2004

(54) INSECT TRAP

(75) Inventor: Yong Biao Liu, Salinas, CA (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 10/359,674

(22) Filed: Feb. 5, 2003

(51) Int. Cl.7 ................................................ A01M 1/20
(52) U.S. Cl. ............................ 43/107; 43/121; 43/122
(58) Field of Search .......................... 43/107, 121, 122, 43/113

(56) References Cited

U.S. PATENT DOCUMENTS

| 3,997,999 | A | * | 12/1976 | Evans | ........................ | 43/107 |
|---|---|---|---|---|---|---|
| 4,141,173 | A | * | 2/1979 | Weimert et al. | ............. | 43/113 |
| 4,282,673 | A | | 8/1981 | Focks et al. | | |
| 4,642,936 | A | | 2/1987 | Jobin et al. | | |
| 5,363,589 | A | * | 11/1994 | Flynn | ........................ | 43/122 |
| 5,682,706 | A | * | 11/1997 | Altenburg | .................... | 43/122 |
| 5,713,153 | A | | 2/1998 | Cook et al. | | |
| 6,134,826 | A | | 10/2000 | Mah | | |
| 6,327,810 | B1 | * | 12/2001 | Howse | ........................ | 43/114 |
| 6,430,868 | B1 | | 8/2002 | Plato et al. | | |

* cited by examiner

Primary Examiner—Kurt Rowan
(74) Attorney, Agent, or Firm—David R. Nicholson; John D. Fado

(57) ABSTRACT

The invention is directed to a trap for insects, without killing them. It employs a housing, with an opening on one end, and at least one layer of parallel strings or line stretched across that opening. The distance between each string corresponds to the width of the body of the target insect. Some type of attractant is used to attract the target insect. Farmers, entomologists, and hobbyists will find this trap useful since it captures insects without killing them, thus permitting identification and further study.

1 Claim, 5 Drawing Sheets

INSECT TRAP

BACKGROUND OF THE INVENTION

The present invention relates to an apparatus for and method of trapping or capturing insects, preferably without killing them.

1. Technical Field

The invention relates to agriculture and entomology, although not exclusively to those fields.

2. Description of Previous Insect Traps

A variety of insect traps have been invented and employed, although the vast majority of these traps kill and often disfigure the insects. Most of these earlier insect traps, for example, employ some form of adhesive material to trap their quarry, and in so doing coat the insect body (or its parts) with said adhesive material thus obscuring the body (parts) and impairing the ability to identify the dead insect. There have been trap designs that do manage to capture some insect species without killing them. These traps generally use attractants such as pheromones or kairomones usually in combination with a type of mechanical funnel structure. Unfortunately, such traps are of quite limited utility because relatively few insect species can be attracted by (known) pheromones or kairomones, and not all insect species exhibit the behavior necessary to make them susceptible to being trapped by a funnel-like device. Therefore, for the vast majority of insect species, no traps have previously been available which can capture them alive and intact. The present invention solves this problem, permitting the capture, retention, and subsequent identification of live insects which can then be used for a variety of purposes such as research or simply for the transportation of such insects to another location.

SUMMARY OF THE INVENTION

The present invention is an apparatus or device used to trap live insects. It is essentially a container or vessel, open on one end, having an insect attractant placed therein or directly above, with at least one layer of parallel strings or lines spread across the open end. The distance between the individual strings or lines is slightly larger than the width of the body of the target insect, and preferably smaller than the wingspan of said target insect, which thus operates to prevent escape once the insect is inside the trap.

Objects and Advantages. The present invention has as its object the capturing of live insects. This gives the researcher, farmer, hobbyist, or anyone else a tool that was not previously available. Scientists studying a particular insect pest, for example, often need a steady supply of such insects on which to conduct research. Farmers or gardeners may have a need to identify a particular type of insect pest in order to take appropriate counter-measures. On the other hand, some insects are beneficial and it is therefore desirable to have the means to capture them at one location and then to transfer them to another location. Others may simply be interested in capturing live insects for their own purposes. This invention thus enables the scientist, farmer, and others to secure a supply of live insects. A further advantage of this invention is that it is renewable and reusable whereas other insect traps which employ adhesive are intended for "one time" use and generally lose their effectiveness over time. Other advantages and aspects of the invention will become apparent from the following description and drawings.

The following is a list of all parts or features along with their nomenclature:

a. First string layer of barrier element, 11
b. Second string layer of barrier element, 12
c. Housing element, 14
d. Detachable top of housing element, 13
e. Attractant element, 16
f. Anti-escape grooves, 18
g. Anti-escape funnel, 20
h. Attachment means for top of housing element, 15
i. Outer rim of top element of housing, 21
j. Line, string, or filament, 22
k. Opening to the housing, 24
l. Insect trap as a whole, 25

DEFINITIONS

Unless defined otherwise, all technical and scientific terms used herein have the meaning commonly understood by a person skilled in the art to which this invention belongs.

"Attractant" may include, without limitation, chemical attractants, plant volatiles, food sources, pheromones, kairomones, mates, perceived mates, black light, and colors. The function of the attractant is to lure the target insect near or into the trap.

Figure 3:
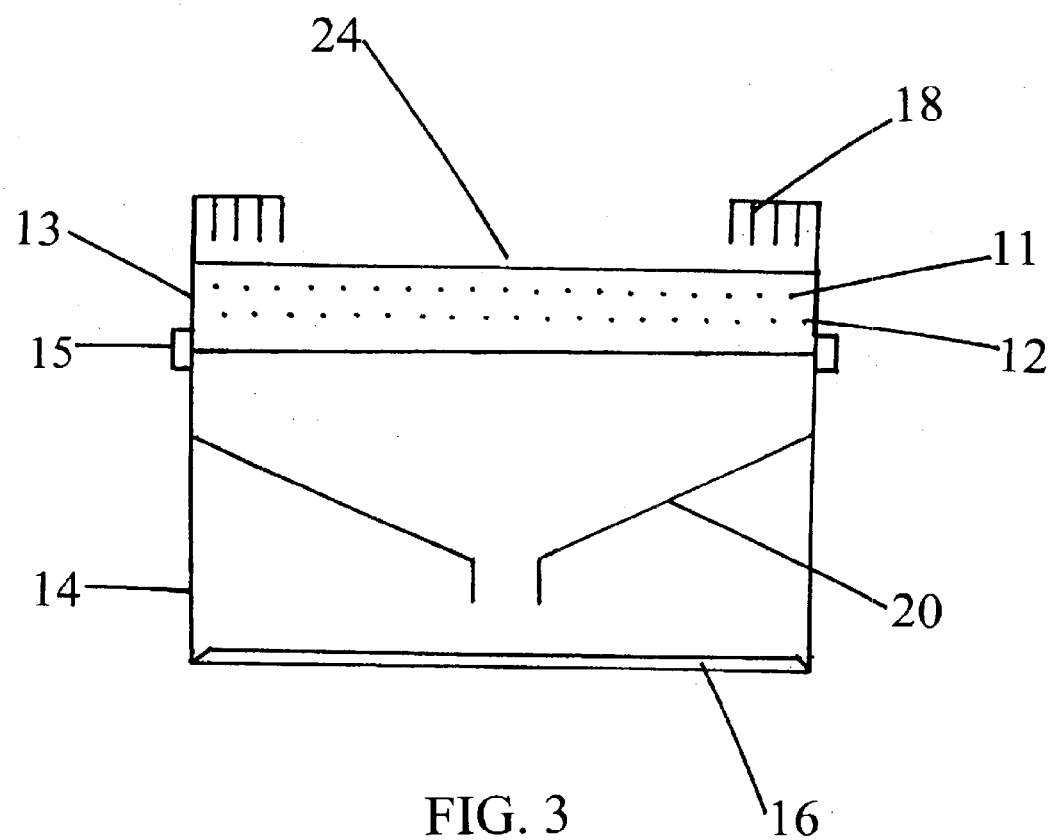
FIG. 3 is a cross section view of the assembled insect trap, with funnel device and anti-escape groove element.

The "housing element" can assume various sizes, shapes, structural design, type of materials, and colors depending on target insects. The housing element can serve as an additional trapping structure by incorporating a funnel device as illustrated in FIG. 3.

"String," "thread," "filament," "wire," and "line" are synonyms and can be used to form the "barrier element."

"Attachment means" refers to, without limitation, the apparatus, fitting, device, technique, or method used to attach the detachable top of the trap to the housing element. Examples include, but are not limited to, adhesives, adhesive tape, clamps, fittings, formed fittings, latches, catches, and similar devices.

DETAILED DESCRIPTION OF THE INVENTION

The present invention is directed to an insect trap that retains the integrity of the insects for identification. It can have different embodiments for different varieties of insects such as, but not limited to, aphids, hoppers, locusts, beetles, flies, moths, and weevils.

The invention includes a housing element, a barrier element, and a means to attract the insects.

The housing element can be of various sizes, shapes, colors, and materials. It can either be designed and manufactured specifically for use as an insect trap, or it can be a container converted and adapted from other uses such as, for example, a glass Petri dish, a metal coffee can, a cardboard box, or any ordinary plastic, metal, fiberglass, composite or even ceramic container. The housing element has a bottom, sidewalls, and a top with an opening across which is placed the barrier element which permits the insects to enter the housing but prevents them from escaping from the housing once inside. The critical features of the housing element are that it serve as a receptacle to hold the captured insects and that it have an opening through which the insects can pass.

The barrier element covers the opening of the housing element, permits one-way passage of the insects into the housing element, but also prevents the insects from passing in the other direction, out of the housing element, and thus escaping. In other words, once the insect is inside the trap, this barrier element will prevent it from flying or crawling out. The barrier element is achieved by creating a grid of (usually) substantially parallel strings or line, disposed across the opening of the housing element. The distance between the individual strings or line is slightly larger than the width of the target insect's body, but preferably smaller than the wingspan of the target insect. Constructing or customizing a trap for different size target insects therefore will result in line spacing of different distances, corresponding to the body size and wing span of whatever the target insect happens to be. In some circumstances, it may be desirable or preferable for the thread or lines to be non-parallel, creating a grid of variable size, and thereby useful for capturing insects of different sizes. The line or thread itself is of sufficiently small diameter to prevent the insect from gaining purchase and walking upright on top of the line. For example, it is envisioned that the insect trap might be placed with the open end facing up, toward the sky or away from the ground. Any insect that alights on one of the strings or line would automatically "roll" to the under side of the string or line, due to the influence of gravity, because the line is of a sufficiently small diameter that the insect will not be able to gain a grip thereon and stay upright. Once the insect releases its grip, it would therefore fall into the housing. It is not, however, necessary to invoke the influence of gravity in order for the trap to be effective since insects may enter the trap in response to an attractant which may be placed inside the trap. For example, some insects will sometimes simply "dive" through the barrier element, in response to the attractant. Once the insects are inside the trap, they will be prevented from flying out by the barrier element since the distance between the strings is less than their wingspan.

Figure 1A:
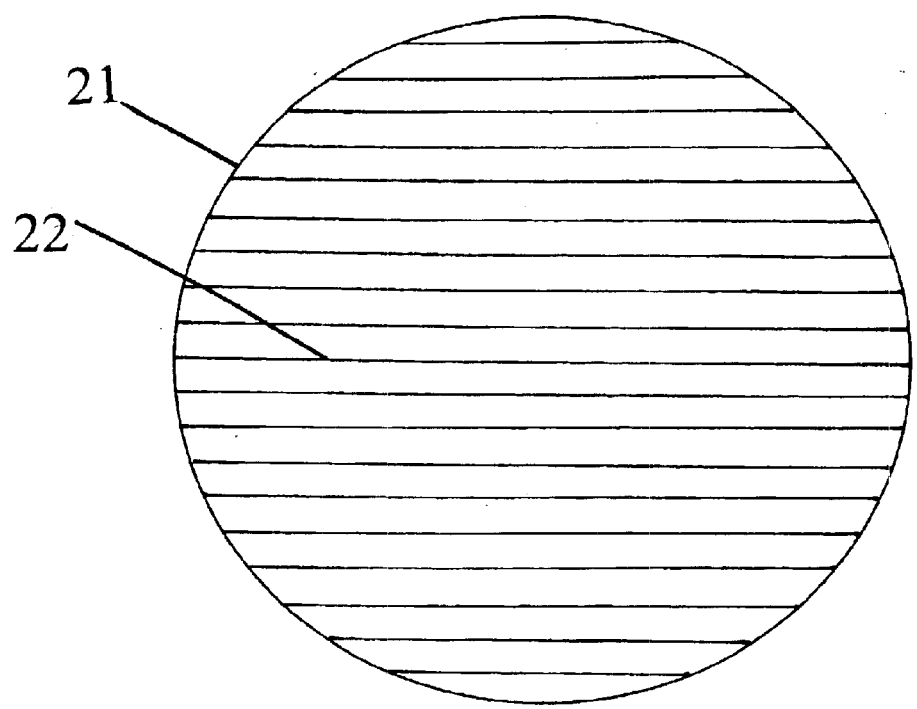
FIG. 1a is a top view of a first string layer.
Figure 1B:
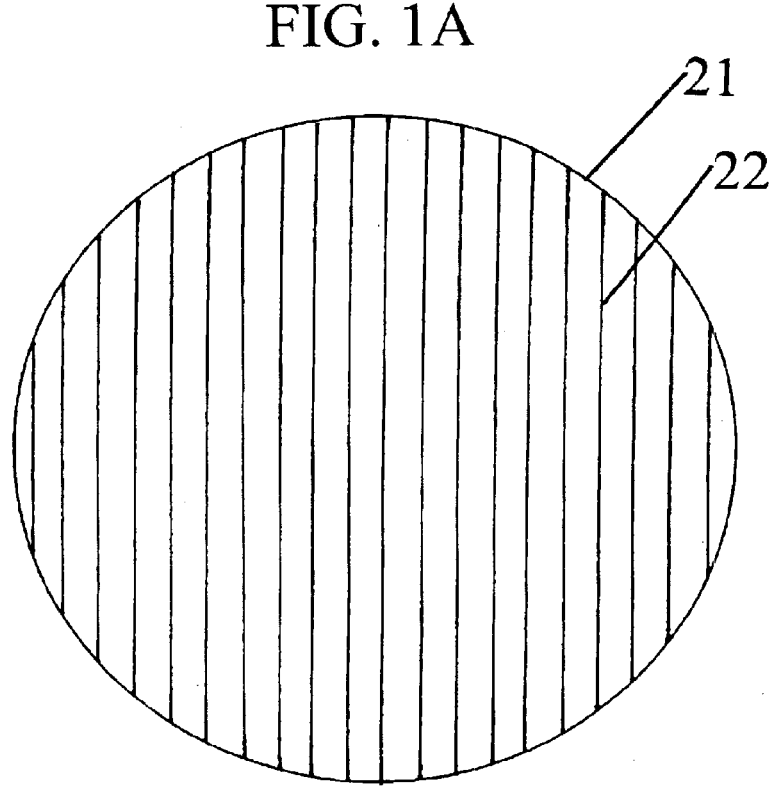
FIG. 1b is a top view of a second string layer.
Figure 1C:
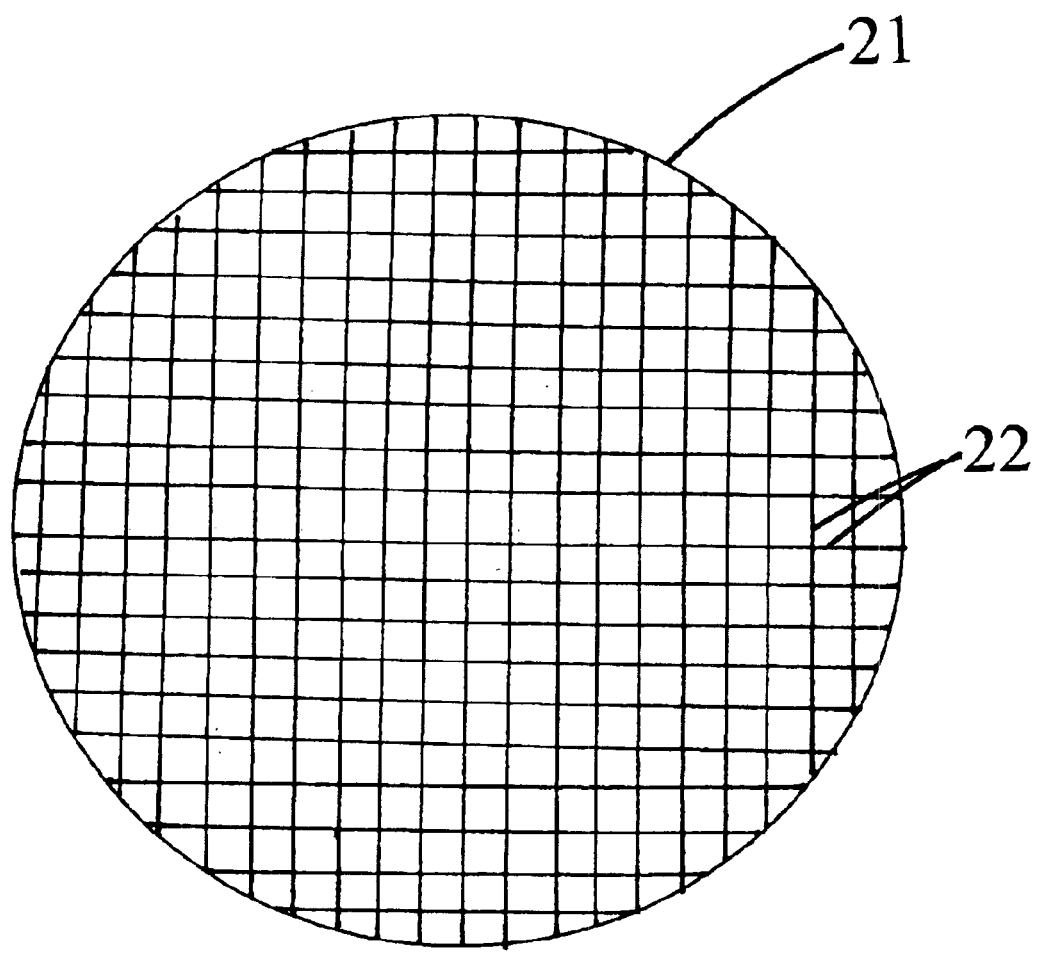
FIG. 1c is a top view of the first string layer and the second string layer stacked one on top of the other, the layers rotated so that the strings appear perpendicular to each other, forming a grid or mesh.

It is possible and sometimes preferable to employ multiple layers of parallel line in order to achieve a mesh effect, thus increasing the effectiveness of the barrier. Two or more layers of line, for example, may be positioned out of phase with each other, thus creating a criss-cross effect when viewed from above. See FIG. 1c. This will operate to create openings in the mesh of suitable shape and size to accommodate the body width of the target insect. The distance between any two layers of line should be slightly greater than the body length of the target insect. This will increase the effectiveness of the trap since any insect perched on a lower layer will find it difficult to reach the next-higher layer of lines, and thus not be able to climb its way out of the trap.

Insects are attracted or lured into the housing by the application therein of an attractant or lure. These attractants or lures may include, by themselves or in combination with any other attractant or lure, pheromones, kairomones, food lures, chemical attractants, visual cues, perceived mates, ultra-violet (black) light, or various colors, fluorescent or otherwise. Insects, responding to the attractant or lure, will pass through the barrier element stretched across the opening of housing and will be unable to pass in the other direction, thus being trapped. Alternatively, it is also possible to place a black light, outside but just above the insect trap, which will attract insects to it. Once the insects come into contact with the black light, they will drop into the trap.

Figure 2:
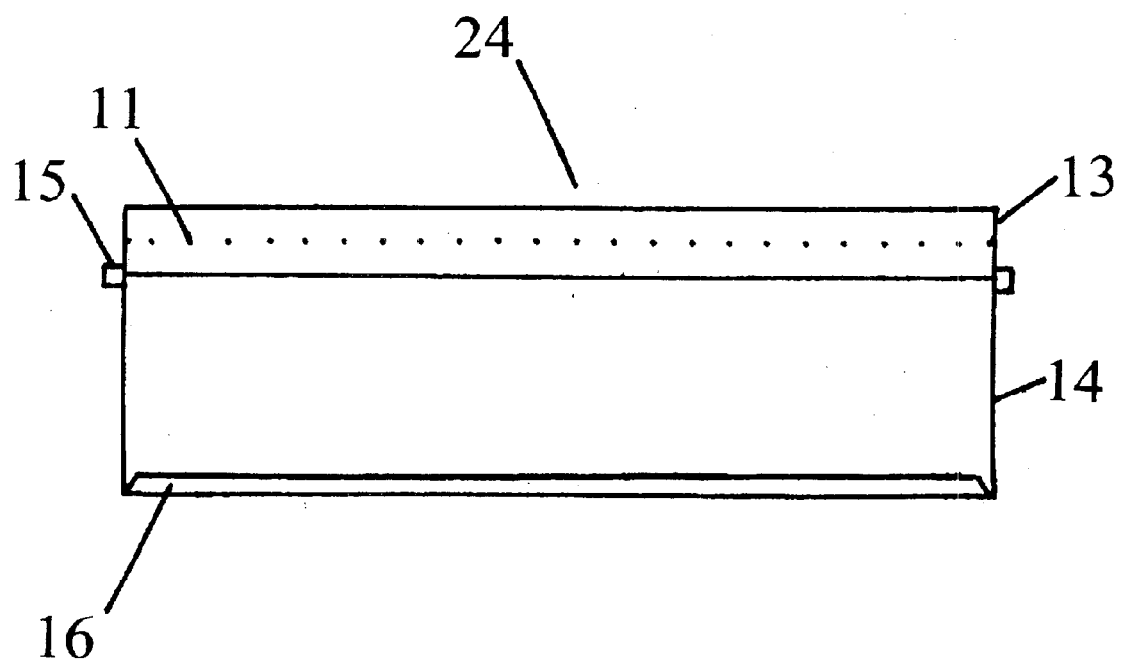
FIG. 2 is an elevation view of the assembled insect trap.

In a first embodiment, FIG. 2, the present invention is directed to a trap intended for a target insect.

In this particular embodiment, the trap was made starting from a 14 cm diameter plastic Petri dish that included a detachable top. The bottom of the Petri dish serves as the housing element, 14. The detachable top of the Petri dish serves as the detachable top of the housing element, 13.

A circular opening of approximately 12 cm diameter was cut in the detachable top of the petri dish (13), forming the opening to the housing, 24.

Figure 4:
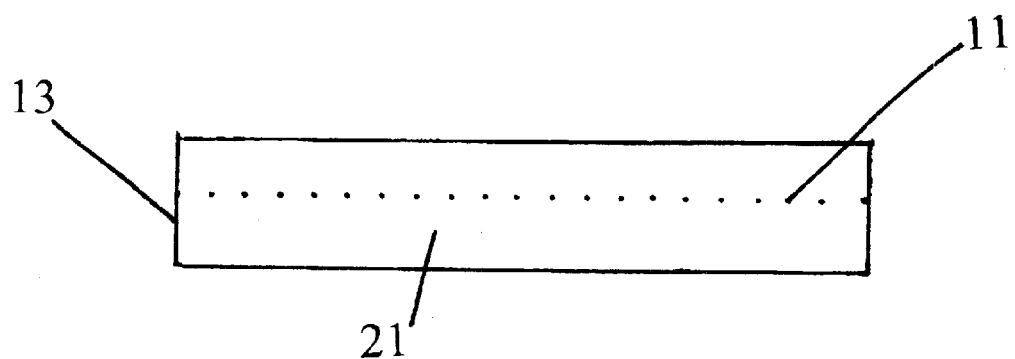
FIG. 4 is an elevation view of the detachable top of the housing element, showing the placement of the holes through which thread or line is sewn to create one layer of substantially parallel thread, thus forming the barrier element.

Holes, approximately 0.2 cm apart, were made on the entire circumference of the outer rim of the top of the housing element, 21. See FIG. 4. The distance between the holes determines the distance between the line or thread forming the barrier element (11) and will therefore depend on the size of the target insect—closer together for smaller insects, farther apart for larger insects.

Thread (22) was then sewn through the pre-made holes of the outer rim of the top of the housing element, 21, forming a layer of parallel threads or a barrier element, 11. See FIG. 1a.

A round yellow paper disk of similar size as the petri dish/housing element (14), was placed at bottom of the petri dish to attract insects, which will serve as the attractant element, 16.

The detachable top of the housing element, 13, is then attached to the housing element, 14, through use of the attachment means, 15, forming the completed trap seen in FIG. 2. The trap can be placed in any area where insects may be found. The insects, responding to the attractant, 16, will pass through the string layer/barrier element, 11, and will then find themselves unable to pass back through the barrier element and escape.

FIG. 3 represents another embodiment of the invention, showing how additional elements can be integrated to increase effectiveness or to tailor the trap for a particular type or size of insect.

Figure 5:
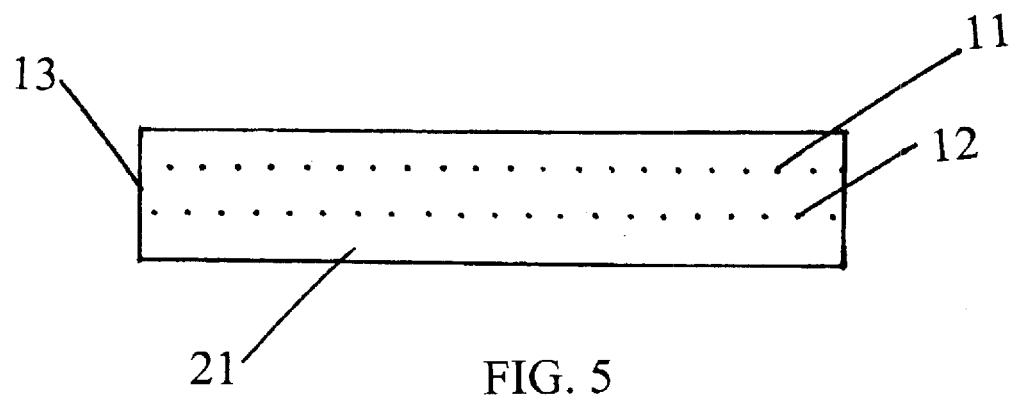
FIG. 5 is an elevation view of the detachable top of the housing element, showing the placement of the holes through which thread or line is sewn to create two layers of substantially parallel thread, thus forming the barrier element.

In this embodiment, two layers of threads, 11 and 12, are employed. (See also FIG. 5). The layers are oriented 90 degrees from each other. When viewed from the top, the two layers appear as a symmetrical mesh of squares, thus forming a less porous barrier (See FIG. 1c) which will result in the capture of smaller insects. Additional layers of thread may be employed (not shown), and the distance between individual threads may also be reduced, which together will form smaller and smaller openings and therefore suitable for capturing and retaining smaller and smaller insects.

FIG. 3 further discloses an anti-escape funnel device (20) which is disposed inside housing element, 14. Insects responding to certain attractants will pass through the string barrier, and through the funnel in order to reach the attractant, 16. Once the insect has passed through the funnel, it will be trapped below, unable to find its way back to the small opening through which it has passed.

FIG. 3 also discloses anti-escape grooves, 18, that are fixed to the underside of the rim of the detachable top of the housing element, 13. The distance between the ridges that form the grooves should be at least equal to the length of the target insect body. Any insect that manages to crawl up the side of the housing element, 14, and through the string barrier elements, 11 and 12, will be stopped when it reaches the anti-escape grooves, 18, which are wide enough to present a physical barrier and deep enough to present a dark void to the escaping insects and which have empirically been shown to present an obstacle to escaping insects.

Further embodiments and variations of the invention are possible, and the examples illustrated in this patent application are by no means exhaustive of such embodiments and variations. For example, the string layers can he integrated into the detachable top of the trap, the bottom portion (housing) of the trap, or they can even be removable (from either the top or bottom) of the trap. Moreover, it is possible to integrate a means to prevent escape of insects from crawling out the trap opening by including other types of physical or chemical barriers, depending on insect species. Physical barriers (in addition to the already-mentioned deep grooves that provide a dark environment that insects may avoid), may include a very smooth surface on the inside of the housing element, mineral dusts such as kaolin powder, adhesives, hairs, and others. These physical elements can also be used in various combinations.

TESTING

The following discussion is presented for illustration purposes only, and is specifically not intended to depict a particular range or to limit the scope of the invention in any way.

One prototype of the trap was made and was tested in lettuce aphid colony cages in a greenhouse. Two types of tests were conducted. One type of test was to determine whether the trap could catch aphids and the second type of tests was to test whether already-trapped aphids could escape by moving upward through the thread layers.

In the first type of tests, the trap was placed inside the aphid colony cages. The trap was then observed after a few hours and then again after the trap had sat overnight. In all tests, aphids were found caught in the trap.

In the second types of tests, a known number of winged lettuce aphids was placed inside the trap. The number of aphids was counted after a few hours, and once again after the trap had sat overnight. The recount of aphids left in the trap for several hours as well as overnight showed that the trap retained all aphids originally placed therein. Observations were also made on aphid behavior. The insects did in fact make repeated attempts to fly upward, trying to pass through the string layers. Almost all of them either hit the bottom layer of strings and dropped to the bottom of the trap, or they simply hung onto the string with their body oriented upside down. Aphids clinging to the string either attempted to fly in which case they landed in the bottom of the trap, or they climbed along the string to the wall of the trap. Again, the aphids appeared to be unable to escape.

The thread used for the prototypes was 0.004 inch diameter ultrathin fishing line with 2 lb load (Berkley Trilene, Berkley Outdoor Technologies Group, Spirit Lake, IOWA). Laboratory observation showed that aphids cannot stand on top of the horizontally positioned ultrathin fishing line.

What is claimed is:

1. An insect trap comprising
   a. a housing having a rim with a top side and an underside;
   b. an opening in said housing through which target insects pass in order to enter said housing;
   c. one or more grooves disposed on the underside of the rim of said housing, said grooves intended to operate as a means to prevent escape of the insects;
   d. a first layer of substantially parallel strings disposed across or within said opening in said housing through which the target insects pass in order to enter said housing, said strings being separated by a lateral distance approximately equal to the width of the target insects' body size;
   e. a second layer of substantially parallel strings disposed within said opening of said housing, said strings of said second layer of parallel strings being oriented approximately perpendicular to said strings of said first layer of parallel strings and separated from said first layer by a distance equal to or greater than the length of the target insect's body size; and
   f. means to attract said insects into said housing.

* * * * *